United States Patent
Palazzo et al.

(10) Patent No.: US 12,021,248 B2
(45) Date of Patent: Jun. 25, 2024

(54) ELECTROCHEMICAL CELL ACTIVATED WITH A LIQUID ELECTROLYTE WETTING THE ELECTRODE ASSEMBLY THROUGH AN OPENING IN ONE OF THE ELECTRODES

(71) Applicant: Greatbatch Ltd., Clarence, NY (US)

(72) Inventors: Marcus J Palazzo, Wheatfield, NY (US); Daniel M. Baumer, Middleport, NY (US)

(73) Assignee: Greatbatch Ltd., Clarence, NY (US)

( * ) Notice: Subject to any disclaimer, the term of this patent is extended or adjusted under 35 U.S.C. 154(b) by 281 days.

(21) Appl. No.: 17/346,328

(22) Filed: Jun. 14, 2021

(65) Prior Publication Data
US 2021/0399367 A1    Dec. 23, 2021

Related U.S. Application Data

(60) Provisional application No. 63/041,147, filed on Jun. 19, 2020.

(51) Int. Cl.
*H01M 50/00* (2021.01)
*H01M 6/04* (2006.01)
(Continued)

(52) U.S. Cl.
CPC ......... *H01M 50/107* (2021.01); *H01M 6/045* (2013.01); *H01M 50/119* (2021.01);
(Continued)

(58) Field of Classification Search
CPC .......... H01M 50/107; H01M 2220/00; H01M 50/50; H01M 2006/5094; H01M 50/289; H01M 6/045
See application file for complete search history.

(56) References Cited

U.S. PATENT DOCUMENTS

| | | |
|---|---|---|
| 5,415,959 A | 5/1995 | Pyszczek et al. |
| 6,610,443 B2 | 8/2003 | Paulot et al. |

(Continued)

FOREIGN PATENT DOCUMENTS

| | | | |
|---|---|---|---|
| DE | 112016003117 T5 | | 4/2018 |
| KR | 20170124302 A | * | 11/2017 |
| KR | 20170124302 A | * | 11/2017 |

OTHER PUBLICATIONS

Glass ceramic as evidenced by Wikipedia (Year: 2023).*
(Continued)

*Primary Examiner* — Cynthia H Kelly
*Assistant Examiner* — Monique M Wills
(74) *Attorney, Agent, or Firm* — Michael F. Scalise

(57) ABSTRACT

A miniature electrochemical cell of a primary or a secondary chemistry with a total volume that is less than 0.5 cc is described. The cell has a casing comprising an annular sidewall supported on a lower plate opposite an upper closure plate. The upper plate has a sealed electrolyte fill port. A current collector having an opening aligned with the fill port contacts an inner surface of the upper plate. An anode active material contacts the lower plate, and a cathode active material contacts the upper closure plate. A dielectric material coats the lower open end of the annular sidewall and a portion of the inner surface of the sidewall. A glass seals the dielectric material to the lower plate. An electrolyte contacts the electrode assembly. The cathode active material contacting the current collector has an opening aligned with the current collector opening and the electrolyte fill port.

15 Claims, 3 Drawing Sheets

(51) Int. Cl.
  *H01M 50/107* (2021.01)
  *H01M 50/119* (2021.01)
  *H01M 50/152* (2021.01)
  *H01M 50/191* (2021.01)
  *H01M 50/289* (2021.01)
  *H01M 6/50* (2006.01)
  *H01M 50/50* (2021.01)

(52) U.S. Cl.
  CPC ....... *H01M 50/152* (2021.01); *H01M 50/191* (2021.01); *H01M 50/289* (2021.01); *H01M 2006/5094* (2013.01); *H01M 50/50* (2021.01)

(56) References Cited

U.S. PATENT DOCUMENTS

| | | | |
|---|---|---|---|
| 7,128,765 B2 | 10/2006 | Paulot et al. | |
| 9,905,819 B2* | 2/2018 | Saimaru | H01M 50/15 |
| 10,446,825 B2* | 10/2019 | Voss | H01M 50/103 |
| 10,461,308 B2* | 10/2019 | Kobayashi | H01M 50/627 |
| 10,957,884 B1* | 3/2021 | Dianetti | H01M 50/116 |
| 2011/0097623 A1 | 4/2011 | Marinis et al. | |
| 2018/0138463 A1* | 5/2018 | Bruch | H01M 50/533 |
| 2021/0111382 A1* | 4/2021 | Rubino | H01M 50/159 |

OTHER PUBLICATIONS

Modofied translation KR20170124302A as taught by Sung (Year: 2017).*

KR 20170124302 A, englsh translation as taught by Sung et al. (Year: 2017).*

"Extended European Search Report, Application No. 21180130.3, dated Nov. 11, 2021".

* cited by examiner

ELECTROCHEMICAL CELL ACTIVATED WITH A LIQUID ELECTROLYTE WETTING THE ELECTRODE ASSEMBLY THROUGH AN OPENING IN ONE OF THE ELECTRODES

CROSS-REFERENCE TO RELATED APPLICATION

This application claims priority to U.S. provisional application Ser. No. 63/041,147, filed on Jun. 19, 2020.

BACKGROUND OF THE INVENTION

1. Field of the Invention

The present invention relates to the conversion of chemical energy to electrical energy. More particularly, the present invention relates to an electrochemical cell having a total size or volume that is less than 0.5 cc. Such so-called miniaturized electrochemical cells enable numerous new and improved medical device therapies. Miniature electrochemical cells are defined as those having a size or total volume that is less than 0.5 cc.

2. Prior Art

The casing for a miniature electrochemical cell according to the present invention consists of three main components: a lower plate supporting a cylindrically-shaped annular sidewall having an open upper end closed with a cover plate. The lower plate, annular sidewall and cover plate are each of a metal material, for example of titanium.

The annular sidewall is selectively coated with a dielectric material to provide electrical isolation of the to-be-housed first active material, for example, an anode active material, from the annular sidewall. A sealing glass is applied to the perimeter of the lower plate with the annular sidewall supported on the glass. The annular sidewall and lower plate are heated to a temperature that is sufficient to achieve a glass-to-metal seal between them. The thickness of the sealing glass combined with the glass seal bonds at the lower plate and at the annular sidewall are sufficient to ensure electrical isolation between the lower plate and the supported annular sidewall.

A layer of a first active material, for example, an anode active material, is deposited into the cavity formed by the lower plate/annular sidewall subassembly. In this position, the anode active material is in electrical contact with the exposed inner surface of the lower plate, which serves as the negative terminal for the cell, but which is electrically isolated from the annular sidewall by the above-described sealing glass. A separator is supported on the anode active material.

Separately, a current collector, for example, a cathode current collector, is contacted to an inner surface of the cover plate. A layer of a second active material, for example, a cathode active material, is then contacted to the current collector opposite the cover plate. The metallic cover plate/current collector/second active material subassembly is then seated on an inner step of the annular sidewall, and the cover plate and sidewall are welded together. In this construction, the cover plate connected to the annular sidewall is in electrical continuity with the cathode active material through the cathode current collector to thereby serve as the positive terminal for the cell.

Finally, the electrode assembly is activated with an electrolyte filled into the casing through a fill port in the cover plate. The fill port is sealed with a closure member welded therein or by melting the material of the cover plate into a solid mass closing the fill port.

However, a vexing problem with this type of cell construction, particularly for a miniature electrochemical cell having a size or total volume that is less than 0.5 cc, is that there is very limited internal space in the casing for electrolyte. There simply isn't any extra internal space that can serve as an avenue for electrolyte to effectively wet the opposite polarity active materials to an extent that is sufficient to promote desirable cell discharge. In addition to a lack of extra internal space, the cathode current collector contacted to the cathode active material substantially blocks or covers the electrolyte fill port in the cover plate.

Thus, there is a need for an improved miniature electrochemical cell that is designed to readily permit electrolyte to flow into the casing to activate the electrode assembly during the filling operation.

SUMMARY OF THE INVENTION

To help ameliorate the electrolyte filling problem described above, the current collector, for example, the cathode current collector, contacted to the inner surface of the cover plate, and the active material, for example, the cathode active material, contacted to the current collector are each provided with at least one opening. The current collector opening and the active material opening reside inwardly from their respective peripheral edges. Importantly, the current collector and active material openings are axially aligned with each other and with the electrolyte fill port in the cover plate. The aligned fill port, current collector opening and the active material opening readily permit activating electrolyte to flow through the cathode active material to the separator and then to the anode active material.

In that respect, the axially aligned fill port, current collector opening and the active material opening eliminate flow problems when filling electrolyte into the casing. Instead, the axially aligned fill port, and the current collector and active material openings enable free flow of the prescribed amount of electrolyte into the casing. Not only does this speed up the time needed for electrolyte filling, but the axially aligned fill port and current collector and active material openings also reduce the need for reworking cells or for a second filling operation.

While the present cell designs are adapted for miniature electrochemical cells, they are also applicable to cells that have a total volume that is greater than 0.5 cc and are not classified as "miniature". Moreover, the present electrochemical cells are not limited to any one chemistry; they can be an alkaline cell, a primary lithium cell, a rechargeable lithium cell, a Ni/cadmium cell, a Ni/metal hydride cell, a supercapacitor, a thin film solid-state cell, and the like. One preferred chemistry is a lithium-ion electrochemical cell comprising a carbon-based or $Li_4Ti_5O_{12}$-based anode and a lithium metal oxide-based cathode, such as of $LiCoO_2$ or lithium nickel manganese cobalt oxide ($LiNi_aMn_b Co_{1-a-b}O_2$). The lithium-ion electrochemical cell is activated with a liquid electrolyte.

These and other aspects of the present invention will become increasingly more apparent to those skilled in the art by reference to the following detailed description and to the appended drawings.

DETAILED DESCRIPTION OF THE PREFERRED EMBODIMENTS

Figure 1:
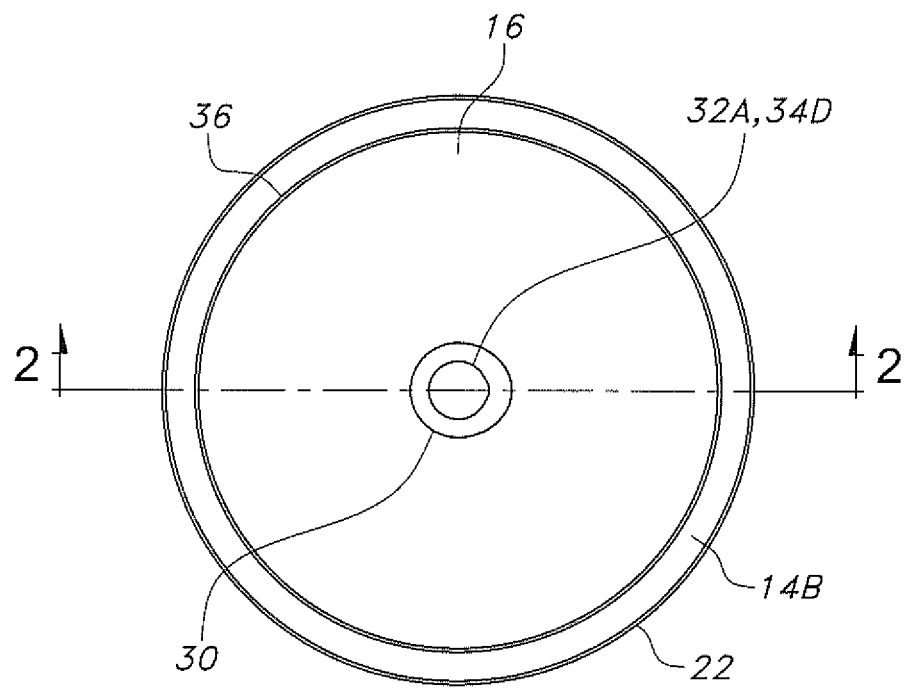
FIG. 1 is a plan view of an electrochemical cell 10 according to the present invention.

Turning now to the drawings, an electrochemical cell 10 according to the present invention comprises an electrode assembly housed in a hermetically sealed casing. The casing comprises a lower plate 12 supporting an annular sidewall 14 having an open end closed by a plate-shaped lid or cover 16. The lower plate 12, annular sidewall 14 and cover plate 16 are each of a biocompatible metal, for example titanium. In addition to titanium, suitable materials for the lower plate 12, annular sidewall 14 and cover plate 16 include stainless steel, mild steel, nickel-plated mild steel, but not limited thereto, so long as the metallic material is compatible for use with the other cell components.

Figure 2:
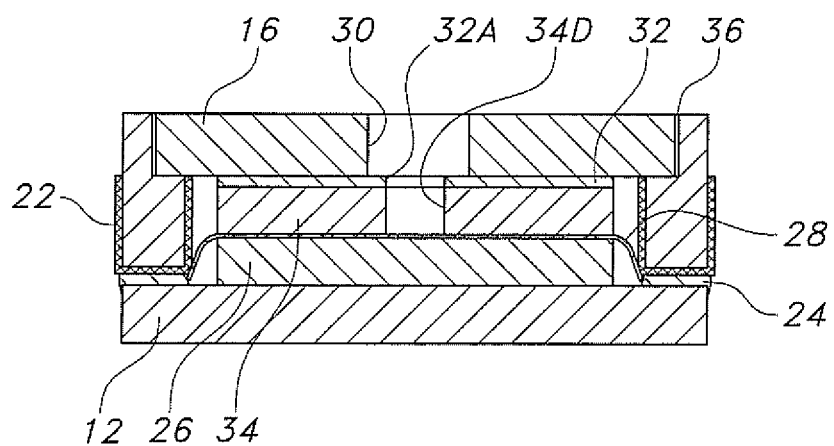
FIG. 2 is a cross-sectional view taken along line 2-2 of FIG. 1.
Figure 2A:
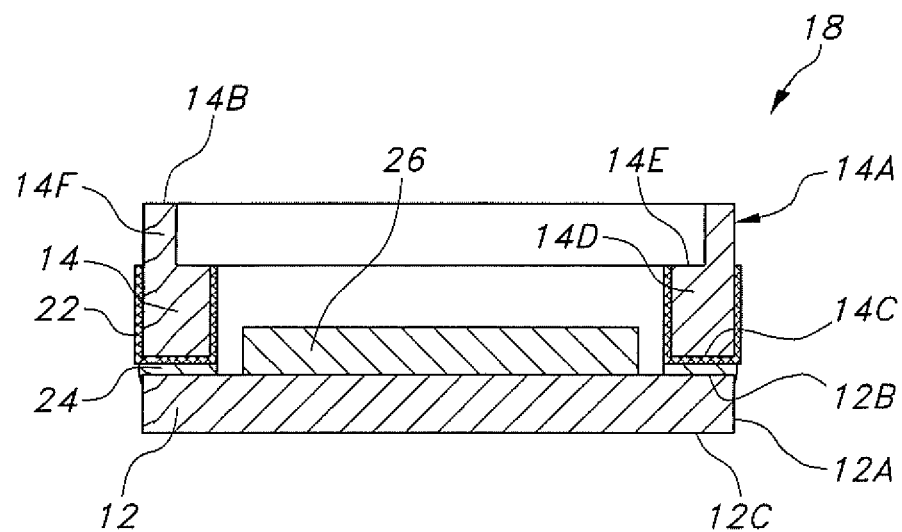
FIGS. 2A and 2B illustrate that the casing for the electrochemical cell 10 is assembled from a casing first or lower subassembly 18 (FIG. 2A) and a casing second or upper subassembly (FIG. 2B).
Figure 2B:
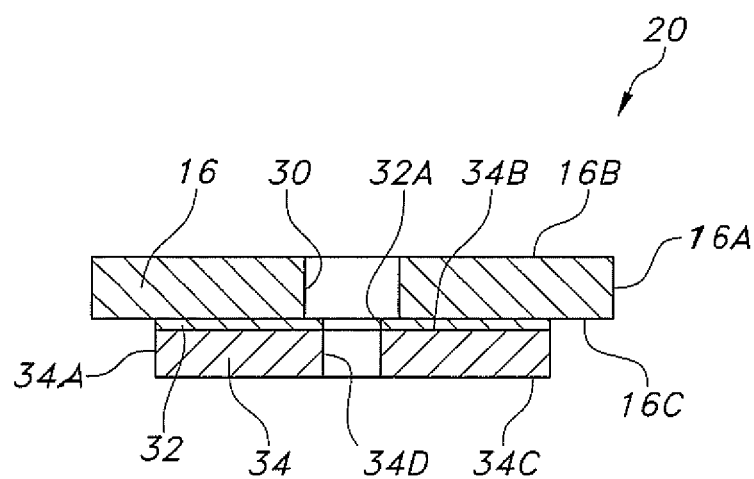

FIGS. 2A and 23 illustrate that the casing for the cell 10 is assembled from a casing first or lower subassembly 18 (FIG. 2A) and a casing second or upper subassembly 20 (FIG. 2B). The casing first subassembly 18 comprises the lower plate 12 having an annular peripheral edge 12A extending to and meeting a lower plate upper surface 12B spaced from a lower plate lower surface 12C.

FIG. 2A further shows that the annular sidewall 14 comprises a cylindrically-shaped outer surface 14A extending to an upper annular edge 14B spaced from a lower annular edge 14C. The upper and lower annular edges 14B, 14C reside along respective imaginary planes that are substantially parallel to each other.

An inner surface of the annular sidewall 14 has a first or lower cylindrically-shaped portion 14D extending upwardly part-way along the height of the sidewall 14 from the lower annular edge 14C to a step 14E. A second or upper cylindrically-shaped portion 14F extends upwardly from the step 14E to the upper annular edge 14B.

An annular layer of dielectric material 22, for example an alumina ($Al_2O_3$) material, is coated on the lower edge 14C and the inner surface of the lower cylindrically-shaped portion 14D of the annular sidewall 14. For ease in manufacturing, the dielectric layer 22 may also be coated on the outer surface 14A.

While the dielectric material 22 is shown in FIGS. 2 and 2A extending along the lower cylindrically-shaped portion 14D of the annular sidewall 14 to the step 14E, to function properly it need only extend along the inner portion 14D to a height that is greater than the thickness of the active material (either cathode or anode) that will subsequently nest in the casing lower subassembly 18.

FIGS. 2 and 2A further show that the lower plate 12 has a diameter at its annular peripheral edge 12A that is substantially similar to the outer diameter of the annular sidewall 14. To secure the lower plate 12 to the annular sidewall 14, an endless ring of sealing glass 24 is contacted or positioned on the upper planar surface 12B of the lower plate 12. The sealing glass 24 has a width that is substantially the same as and aligned with the lower edge 14C of the annular sidewall 14.

Depositing the sealing glass 24 is achieved by several suitable methods including screen printing, dispensing, dipping into a frit paste or the use of a preformed endless glass ring. Suitable sealing glasses include both vitreous and crystallizing compositions that exhibit good electrical isolation properties and form mechanical bonds with good wetting characteristics to the metals of the lower plate 12 and the annular sidewall 14. Exemplary sealing glasses include, but are not limited to, Ferro IP510, Corning 1890, Schott 8422 and Schott 8629.

The lower plate 12, sealing glass 24 and annular sidewall 14 comprising the casing first subassembly 18 are then heated to a temperature that is sufficient to burn off any organic binders that may be present in the glass 24 and to flow the glass to achieve a glass-to-metal seal between the lower plate 12 and the annular sidewall 14. The sealing glass 24 has a thickness that ranges from about 0.002 inches to about 0.0025 inches, which is sufficient to ensure electrical isolation between the lower plate 12 and the annular sidewall 14.

After the lower plate 12 and the annular sidewall 14 are secured together by the intermediate sealing glass 24, a first electrode active material 26, for example, an anode active material, is supported on the upper surface 12B of the lower plate. The anode active material 26 preferably extends to the dielectric coating 22 on the inner surface of the lower cylindrically-shaped portion 14D of the annular sidewall 14. The anode active material 26 is deposited on the lower plate 12 using any one of many suitable techniques including being pressed into contact with the plate, preformed into a sheet that is pressed into contact with the plate, sprayed onto the plate, sputtered onto the plate, or coated on the plate. While not intending to limit the present electrochemical cell 10, the anode active material 26 has a thickness that ranges from about-5 μm to about 1 mm. In other embodiments, the anode active material 26 has a thickness that is greater than 1 mm.

Illustrative anode active materials include carbon-based materials selected from coke, graphite, acetylene black, carbon black, glass carbon, hairy carbon, and mixtures thereof, or lithiated materials selected from $Li_4Ti_5O_{12}$, lithiated silver vanadium oxide, lithiated copper silver vanadium oxide, lithiated copper sulfide, lithiated iron sulfide, lithiated iron disulfide, lithiated titanium disulfide, lithiated copper vanadium oxide, $Li_xCu_wAg_yV_2O_z$ with $0.5 \leq x \leq 4.0$, $0.01 \leq w \leq 1.0$, $0.01 \leq y \leq 1.0$ and $5.01 \leq z \leq 6.5$, and mixtures thereof. Lithium is also a suitable anode active material.

A separator 28 (FIG. 2) is placed on top of the anode active material 26. The separator 28 preferably extends to the dielectric coating 22 on the inner surface of the lower cylindrically-shaped portion 14D of the annular sidewall 14. The separator 28 has a thickness that ranges from about 5 μm to about 30 μm.

Illustrative separator materials include non-woven glass, polypropylene, polyethylene, microporous materials, glass fiber materials, ceramics, the polytetrafluorethylene membrane commercially available under the designations ZITEX (Chemplast Inc.), the polypropylene membrane commercially available under the designation CELGARD (Celanese Plastic Company Inc.) and DEXIGLAS (C. H. Dexter, Div., Dexter Corp.). Other separator materials that are useful with the present invention include woven fabrics comprising halogenated polymeric fibers, as described in U.S. Pat. No. 5,415,959 to Pyszczek et al., which is assigned to the assignee of the present invention and incorporated herein by reference. Examples of halogenated polymeric materials that are suitable for the present invention include, but are not limited to, polyethylene tetrafluoroethylene, which is commercially available under the name Tefzel, a trademark of the DuPont Company, polyethylenechlorotrifluoroethylene which is commercially available under the name Halar, a trademark of the Allied Chemical Company, and polyvinylidene fluoride.

FIG. 2B illustrates that the casing second subassembly 20 comprises the upper plate-shaped cover 16 having an annular peripheral edge 16A extending to and meeting an upper plate upper surface 16B spaced from an upper plate lower surface 16C. An electrolyte fill opening or port 30 extends through the thickness of the cover plate 16 to the upper and lower surfaces 16B, 16C thereof. While the fill port 30 is shown substantially centered in the cover plate 16, that is not necessary. To serve as a fill opening, the port 30 need only provide an open path from the upper surface 16B to the lower surface 16C of the cover plate 16.

Separately, a current collector 32 is contacted to the lower surface 16C of the cover plate 16. At least one opening 32A extends completely through the thickness of the current collector 32. The at least one current collector opening 32A has a diameter that ranges from about 0.005 inches to about 0.016 inches, which is sufficient to allow electrolyte to readily flow therethrough. The cathode current collector 32 has a thickness that ranges from about 0.1 µm to about 50 µm, and is deposited on the lower surface 16C of the cover plate 16 by any one of many suitable processes including by a physical vapor deposition (PVD) process, for example, sputter deposition or evaporation deposition. Cathode current collector 32 can also be physically attached to the cover plate 16 by a weld. Exemplary current collector materials include nickel, titanium, copper, and Ti/NiV composites.

A second electrode active material, for example, a cathode active material 34 is contacted to the current collector 32 opposite the cover plate 16. The cathode active material 34 has an outer annular edge 34A extending to an active material upper face 34B spaced from an active material lower face 34C. That way, the exemplary cathode active material 34 is in electrical continuity with the cathode current collector 32 and the cover plate 16.

The cathode active material 34 is deposited using any one of many suitable methods (i.e., dispensed, pressed, preformed, sprayed, sputter deposition, evaporation deposition, tape casted, and as a coating). While not intending to limit the present electrochemical cell 10, the cathode active material 34 has a thickness extending to its upper and lower faces 34B and 34C that ranges from about 5 µm to about 1 mm. In other embodiments, the cathode active material 34 has a thickness that is greater than 1 mm. Suitable cathode active materials 34 are selected from lithium nickel manganese cobalt oxide ($LiNi_aMn_bCo_{1-a-b}O_2$), $LiCoO_2$, $LiNiO_2$, $LiMnO_2$, TiS, FeS, $FeS_2$, $CF_x$, $Ag_2O$, $Ag_2O_2$, $Ag_2CrO_4$, silver vanadium oxide (SVO), copper silver vanadium oxide (CSVO), $V_2O_5$, $MnO_2$.

If desired, the cathode active material 34 is mixed with a binder material and a solvent prior to being deposited on the cover plate 16. Binders such as, but not limited to, a powdered fluoro-polymer, more preferably powdered polytetrafluoroethylene or powdered polyvinylidene fluoride and solvents, such as but not limited to, trimethylphosphate (TMP), dimethylformamide (DMF), dimethylacetamide (DMAc), tetramethylurea (TMU), dimethylsulfoxide (DMSO), or n-methyl-2-pyrrolidone (NMP) may be used.

In addition, up to about 10 weight percent of a conductive diluent may be added to the cathode active material 34 to improve conductivity. Suitable materials for this purpose include acetylene black, carbon black, and graphite or, a metallic powder such as powdered nickel, aluminum, titanium, and stainless steel.

Figure 3:
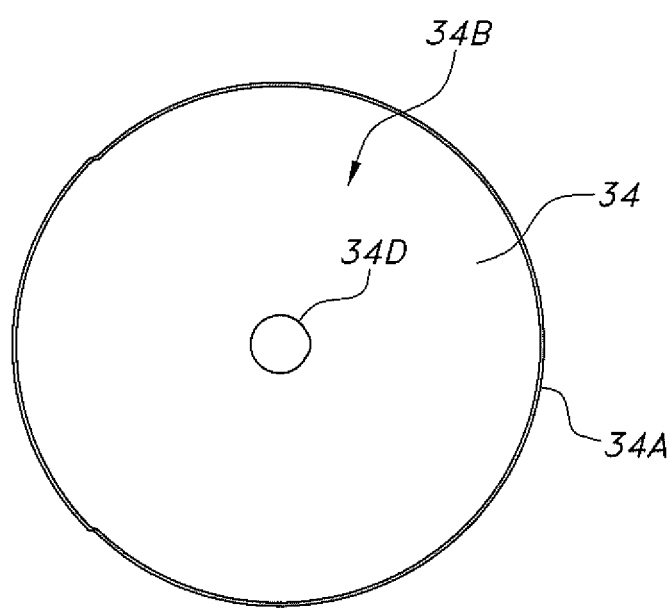
FIG. 3 is a plan view of the cathode active material 34 including the active material opening 34D extending through the thickness thereof.

As shown in FIGS. 2, 2B and 3, the cathode active material 34 is provided with at least one active material opening 34D that extends to the active material upper and lower faces 34B and 34C. An important aspect of the present invention is that the opening 34D is axially aligned with the current collector opening 32A and the electrolyte fill port 30. The purpose of the aligned current collector opening 32A, active material opening 34D and the electrolyte fill port 30 is to provide an open pathway for electrolyte to flow through the current collector 32 and the cathode active material 34 to wet the separator 28 and the anode active material 26. This is especially important in the miniature electrochemical cells of the present invention having a size or total volume that is less than 0.5 cc. In such small size cells, the desired volume of electrolyte is sufficient to activate the anode and cathode active materials 26, 34 without there being an overabundance of electrolyte. Without the aligned current collector and active material openings 32A, 34D, it is sometimes difficult for the electrolyte to sufficiently wet the lower electrode active material 26 to promote acceptable cell discharge.

It is often the case that a current collector having an active material contacted to both of its opposed major surfaces has a plurality of openings. These openings provide the current collector with a structure similar to that of a screen. The openings help the opposed sheets or layers of active material lock to each other through the openings.

However, in the present electrochemical cell 10, since the active material 34 only contacts the current-collector 32 on one side (the side opposite the cover plate 16), a current collector screen is not needed. In fact, having the current collector 32 as a continuous sheet of electrically conductive material saves processing costs generally associated with providing the plurality of perforations. In that respect, if the current collector 32 is a screen, the opening 32A represents at least one of the screen openings. On the other hand, if the current collector 32 is a continuous un-perforated sheet of electrically conductive material, the at least one opening 32A is provided in axial alignment with the electrolyte fill port 30 and the active material opening 34D. In an exemplary embodiment, the cathode active material has a diameter of about 0.068 inches, or about 0.005 inches less than the inside diameter of the annular sidewall 14. In an exemplary embodiment, the cathode active material has a diameter of about 0.068 inches. In another exemplary embodiment, the cathode active material has a diameter that is about 0.005 inches less than the inside diameter of the annular sidewall 14. The opening 34D has a diameter that ranges from about 0.005 inches to about 0.016 inches.

The cover plate 16 has a diameter that is sized to fit into the second or upper cylindrically-shaped portion 14F of the annular sidewall 14, supported on the step 14E. In this seated position, the upper planar surface 16B of the cover plate 16 is substantially co-planar with the upper annular edge 14B of the sidewall 14. As shown in FIG. 1, the cover plate 16 is hermetically secured or sealed to the sidewall 14 with an annular weld 36.

An activating electrolyte (not shown) is then filled into the casing through the fill port 30. The fill port 30 is preferably closed with a closure plug (not shown) that has been press-fit into the opening followed by being welded to the cover plate 16. Alternately, the fill port 30 is closed by directing a laser beam at the cover plate 16 to cause material of the plate to flow into and hermetically seal the port 30. Suitable closure systems for sealing an electrolyte fill port are described in U.S. Pat. No. 6,610,443 to Paulot et al., U.S. Pat. No. 7,128,765 to Paulot et al. and 10,446,825 to Voss et al. These patents are assigned to the assignee of the present invention and incorporated herein by reference.

The activating electrolyte is a nonaqueous and ionically conductive material mixture serving as a medium for migration of ions between the anode and cathode active materials during conversion of ions in atomic or molecular forms which migrate from the anode active material 26 to the cathode active material 34. Nonaqueous electrolytes that are suitable for the present electrochemical cell 10 are substantially inert to the anode and cathode active materials, and they exhibit those physical properties necessary for ionic transport, namely, low viscosity, low surface tension and wettability.

A suitable electrolyte has an inorganic, ionically conductive lithium salt dissolved in a mixture of aprotic organic solvents comprising a low viscosity solvent and a high permittivity solvent. The inorganic, ionically conductive lithium salt serves as the vehicle for migration of the anode ions to intercalate or react with the cathode active material 34. Suitable lithium salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LiSCN, $LiO_3SCF_3$, $LiC_6F_5SO_3$, $LiO_2CCF_3$, $LiSO_6F$, $LiB(C_6H_5)_4$ and $LiCF_3SO_3$, and mixtures thereof.

Low viscosity solvents useful with the present electrochemical cell 10 include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate, methyl propyl carbonate, ethyl propyl carbonate, diethyl carbonate, dipropyl carbonate, and mixtures thereof, and high permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-pyrrolidinone (NMP), and mixtures thereof.

In the present electrochemical cell 10, the preferred anode active material 26 is lithium metal and the preferred electrolyte is 0.8M to 1.5M $LiAsF_6$ or $LiPF_6$ dissolved in a 30:70 mixture, by volume, of propylene carbonate as the preferred high permittivity solvent and 1,2-dimethoxyethane as the preferred low viscosity solvent.

The axially aligned fill port 30, current collector opening 32A and the active material opening 34D allows the casing to be filled using a vacuum filling process. Without the axially aligned openings 30, 32A and 34D, the electrode assembly would need to be soaked in electrolyte and the remaining casing void volume filled with additional electrolyte prior to welding the cover plate 16 to the annular sidewall 14. This creates multiple problems. First, internal voids within the opposite polarity electrode active materials are not optimally filled with electrolyte without a vacuum drawing electrolyte into all available porosity. A second issue relates to the difficulty in welding of the cover plate 16 to the annular sidewall 14 in the presence of electrolyte. Heat generated by the welding process can cause electrolyte to evaporate and form out-gassing byproducts that can contaminate the weld 36, thereby reducing weld integrity.

When the present electrochemical cell 10 is of a primary chemistry, the combined thicknesses of the anode active material 26, separator 28, the cathode active material 34 and the cathode current collector 32 is substantially equal to or slightly greater than the combined height of the sealing glass 24 and the lower inner cylindrically-shaped portion 14D of the annular sidewall 14 as measured from the lower plate 12 to the step 14E.

That way, there is sufficient stack pressure inside the electrochemical cell 10 to provide intimate contact between the anode/cathode electrode assembly to thereby ensure acceptable discharge for the primary chemistry cell.

Alternatively, when the electrochemical cell 10 is of a secondary chemistry, the combined thicknesses of the anode active material 26, the separator 28, the cathode active material 34 and the cathode current collector 32 is somewhat less than the combined height of the sealing glass 24 and the lower inner cylindrically-shaped portion 14D of the annular sidewall 14 as measured from the lower plate 12 to the step 14E. That way, there is sufficient free space inside the casing to accommodate expansion and contraction of the electrode stack or anode/cathode electrode assembly as the electrochemical cell 10 of the secondary chemistry is subjected to charge and discharge cycles.

With the electrochemical cell 10 comprising the electrode assembly of the anode active material 26/cathode active material 34 activated with the electrolyte and housed inside the casing comprising the casing lower subassembly 18 (FIG. 2A) hermetically sealed to the casing upper subassembly 20 (FIG. 2B), the cover plate 16 welded to the annular sidewall 14 in contact with the cathode current collector 32 and the cathode active material 34 serves as the positive terminal and the lower plate 12 in contact with the anode active material 26 serves as the negative terminal for the cell.

As those skilled in the art will readily appreciate, the cathode active material 34 can be switched with the anode active material 26. In this alternate embodiment, the cathode active material 34 in contact with cathode current collector 32 contacting the lower plate 12 serves as the positive terminal and the anode active material 26 in contact with the cover plate 16 welded to the annular sidewall 14 serves as the negative terminal.

However, the preferred cell design has the cathode current collector 32 and cathode active material 34 in electrical continuity with the cover plate 16. This construction is desirable because cathode active materials 34 that are useful with the present electrochemical cell 10 generally have better structure integrity than the anode active materials 26, particularly when the anode active material is lithium. Lithium is a relatively soft material. Forming an accurate opening through lithium is difficult due to the soft nature of the material. In contrast, a body of the cathode active materials described above is better able to have an opening formed therethrough without compromising structural integrity.

Thus, with the lower plate 12 having a surface area ranging from about 1 $mm^2$ to about 1 $cm^2$ (surface area of either of the upper and lower surfaces 12b, 12C), the upper surface 16B of the cover plate 16 and the upper edge 14B of the annular sidewall 14 having a combined surface area ranging from about 1 $mm^2$ to about 1 $cm^2$, and with the height of the casing as measured from the lower surface 12C of the lower plate 12 to the upper edge 14B of the annular sidewall 14 ranging from about 250 μm to about 2.5 mm, the present electrochemical cell 10 represents an advancement in electrochemical technology. The cell can be built with a total volume that is less than 0.5 cc but, as a hermetically sealed enclosure, is capable of being implanted in human or animal body tissue for extended periods of time.

It is appreciated that various modifications to the inventive concepts described herein may be apparent to those of ordinary skill in the art without departing from the spirit and scope of the present invention as defined by the appended claims.

What is claimed is:

1. An electrochemical cell, comprising:
    a) a casing, comprising:
        i) a metallic annular sidewall extending to an upper annular edge defining an upper open end spaced from a lower annular edge defining a lower open end, the metallic annular sidewall having an inner surface;
        ii) a metallic upper plate closing the upper open end of the metallic annular sidewall, wherein the metallic upper plate has a hermetically sealed electrolyte fill port extending to an inner surface thereof;
        iii) a current collector contacted to the inner surface of the metallic upper plate, wherein the current collector has at least one current collector opening extending through its thickness and being axially aligned with the electrolyte fill port;
        iv) a metallic lower plate;
        v) a dielectric material coating the lower annular edge and at least a portion of the inner surface of the metallic annular sidewall; and
        vi) a ring-shaped sealing glass in a glass-to-metal sealed relationship with the metallic lower plate and in a hermetically sealed relationship with the dielectric material coating the lower annular edge of the metallic annular sidewall; and
    b) an electrode assembly housed inside the casing, the electrode assembly comprising:
        i) an anode active material;
        ii) a cathode active material; and
        iii) a separator segregating the anode active material from directed physical contact with the cathode active material,
        iv) wherein one of the anode and cathode active materials contacts the current collector in turn contacting the metallic upper plate serving as one terminal for the cell,
        v) wherein the one of the anode and cathode active materials has an electrode active material opening that is axially aligned with the current collector opening and the electrolyte fill port, and
        vi) wherein the other of the anode and cathode active materials contacts the metallic lower plate serving as the other terminal for the cell; and
    c) an activating electrolyte contacting the electrode assembly.

2. The electrochemical cell of claim 1, wherein the dielectric material is an alumina ($Al_2O_3$).

3. The electrochemical cell of claim 1, wherein the sealing glass is a vitreous and crystallizing composition.

4. The electrochemical cell of claim 1, wherein an outer peripheral edge of the metallic lower plate has a diameter that is substantially the same as that of an outer surface of the metallic annular sidewall.

5. The electrochemical cell of claim 1, wherein an outer surface of the metallic annular sidewall is cylindrical.

6. The electrochemical cell of claim 1, wherein an inner surface of the metallic annular sidewall is provided with a step, and wherein the metallic upper plate is seated on the step.

7. The electrochemical cell of claim 1, wherein an upper surface of the metallic upper plate is substantially co-planar with the upper open end of the metallic annular sidewall.

8. The electrochemical cell of claim 1, wherein the metallic upper plate is welded to the metallic annular sidewall to thereby close the upper open end thereof.

9. The electrochemical cell of claim 1, wherein the electrolyte fill port is either welded closed or provided with a closure plug that is welded to the metallic upper plate to hermetically seal the electrolyte fill port.

10. The electrochemical cell of claim 1, wherein the anode active material is selected from the group of coke, graphite, acetylene black, carbon black, glass carbon, hairy carbon, $Li_4Ti_5O_{12}$, lithiated silver vanadium oxide, lithiated copper silver vanadium oxide, lithiated copper sulfide, lithiated iron sulfide, lithiated iron disulfide, lithiated titanium disulfide, lithiated copper vanadium oxide, $Li_xCu_wAg_yV_2O_z$ with $0.5 \leq x \leq 4.0$, $0.01 \leq w \leq 1.0$, $0.01 \leq y \leq 1.0$ and $5.01 \leq z \leq 6.5$, lithium, and mixtures thereon, and wherein the cathode active material is selected from the group of lithium nickel manganese cobalt oxide ($LiNi_aMn_bCo_{1-a-b}O_2$), $LiCoO_2$, $LiNiO_2$, $LiMnO_2$, TiS, FeS, $FeS_2$, $CF_x$, $Ag_2O$, $Ag_2O_2$, $Ag_2CrO_4$, silver vanadium oxide (SVO), copper silver vanadium oxide (CSVO), $V_2O_5$, $MnO_2$.

11. The electrochemical cell of claim 1 having a total volume that is less than 0.5 cc.

12. An electrochemical cell, comprising:
    a) a casing, comprising:
        i) a metallic annular sidewall extending to an upper annular edge defining an upper open end spaced from a lower annular edge defining a lower open end, wherein an inner surface of the metallic annular sidewall is provided with a step;
        ii) a metallic upper plate seated on the step to close the upper open end of the metallic annular sidewall, wherein the metallic upper plate has a hermetically sealed electrolyte fill port extending to an inner surface thereof;
        iii) a current collector contacted to the inner surface of the metallic upper plate, wherein the current collector has at least one current collector opening extending through its thickness and being axially aligned with the electrolyte fill port;
        iv) a metallic lower plate;
        v) an alumina ($Al_2O_3$) coating at least a portion of an inner surface and the lower annular edge of the metallic annular sidewall; and
        vi) a ring-shaped sealing glass in a glass-to-metal sealed relationship with the metallic lower plate and in a glass-to-ceramic sealed relationship with the alumina at the lower annular edge of the metallic annular sidewall; and
    b) an electrode assembly housed inside the casing, the electrode assembly comprising:
        i) an anode active material;
        ii) a cathode active material; and
        iii) a separator segregating the anode active material from directed physical contact with the cathode active material,
        iv) wherein one of the anode and cathode active materials contacts the current collector in turn contacting the metallic upper plate serving as one terminal for the cell, v) wherein the one of the anode and cathode active materials has an electrode active material opening that is axially aligned with the current collector opening and the electrolyte fill port, and vi) wherein and the other of the anode and cathode active materials contacts both the alumina coating at least a portion of the inner surface of the metallic annular sidewall and the metallic lower plate serving as the other terminal for the cell; and c) an activating electrolyte contacting the electrode assembly.

13. The electrochemical cell of claim 12, wherein the metallic upper plate is welded to the metallic annular sidewall to thereby close the upper open end thereof.

14. The electrochemical cell of claim 12, wherein the sealing glass is a vitreous and crystallizing composition.

15. An electrochemical cell, comprising:
a) a casing, comprising:
  i) a metallic upper closure plate having a hermetically sealed electrolyte fill port extending to an inner surface thereof;
  ii) a metallic annular sidewall extending to a lower annular edge defining a lower open end opposite an upper annular edge defining an upper open end, the metallic upper closure plate hermetically sealed to the upper open end of the metallic annular sidewall;
  iii) a cathode current collector contacted to the inner surface of the metallic upper closure plate, wherein the cathode current collector has at least one current collector opening extending through its thickness and being axially aligned with the electrolyte fill port; and
  iv) a metallic lower plate; and
b) an electrode assembly housed inside the casing, the electrode assembly comprising:
  i) an anode active material segregated from directed physical contact with a cathode active material by an intermediate separator,
  ii) wherein the anode active material contacts the metallic lower plate,
  iii) wherein the cathode active material contacts the current collector contacted to the metallic upper closure plate, and
  iv) wherein the cathode active material has a cathode active material opening that is axially aligned with the cathode current collector opening and the electrolyte fill port;
c) a dielectric material coating the lower annular edge and at least a portion of the inner surface of the metallic annular sidewall, wherein the separator contacts the dielectric material coating the inner surface of the metallic annular sidewall;
d) a sealing glass hermetically sealing the dielectric material coating the lower annular edge of the metallic annular sidewall to the metallic lower plate; and
e) an activating electrolyte contacting the electrode assembly.

* * * * *